US012720508B2

(12) United States Patent
Qiao et al.

(10) Patent No.: US 12,720,508 B2
(45) Date of Patent: Aug. 25, 2026

(54) METHOD AND APPARATUS FOR DETERMINING TIME-DOMAIN WINDOW, AND USER EQUIPMENT, BASE STATION AND STORAGE MEDIUM

(71) Applicant: BEIJING XIAOMI MOBILE SOFTWARE CO., LTD., Beijing (CN)

(72) Inventors: Xuemei Qiao, Beijing (CN); Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 300 days.

(21) Appl. No.: 18/569,176

(22) PCT Filed: Jun. 11, 2021

(86) PCT No.: PCT/CN2021/099793

§ 371 (c)(1),
(2) Date: Dec. 11, 2023

(87) PCT Pub. No.: WO2022/257127

PCT Pub. Date: Dec. 15, 2022

(65) Prior Publication Data

US 2024/0276464 A1 Aug. 15, 2024

(51) Int. Cl.
*H04W 72/0446* (2023.01)
*H04L 5/14* (2006.01)

(52) U.S. Cl.
CPC ........... *H04W 72/0446* (2013.01); *H04L 5/14* (2013.01)

(58) Field of Classification Search
CPC ... H04L 1/187; H04L 5/16; H04L 5/22; H04L 27/2671; H04L 5/0078; H04W 72/0446
USPC ........................................ 370/252, 329, 442
See application file for complete search history.

(56) References Cited

U.S. PATENT DOCUMENTS

2003/0031149 A1* 2/2003 Odenwalder ......... H04L 1/0046 370/335
2018/0132209 A1 5/2018 Shimezawa et al.
2019/0104532 A1 4/2019 Park et al.
2020/0107233 A1 4/2020 Agiwal et al.
2022/0231815 A1* 7/2022 Sun ....................... H04L 5/0051
2023/0199735 A1* 6/2023 Li ..................... H04W 72/0446 370/336

(Continued)

FOREIGN PATENT DOCUMENTS

CN 108012337 A 5/2018
CN 112770375 A 5/2021

(Continued)

OTHER PUBLICATIONS

Moderator (China Telecom), "FL Summary of joint channel estimation for PUSCH", 3GPP TSG RAN WG1 Meeting #105-e, R1-2105979, E-Meeting, May 10-27, 2021, (36p).

(Continued)

*Primary Examiner* — John Pezzlo
(74) *Attorney, Agent, or Firm* — Arch & Lake ILP; Hao Tan; Shen Wang

(57) ABSTRACT

The present disclosure provides a method and an apparatus for determining a time domain window, and a user equipment, a base station and a storage medium. The method comprises: receiving indication information sent by a base station; and determining a time-domain window based on the indication information.

11 Claims, 8 Drawing Sheets

(56) References Cited

U.S. PATENT DOCUMENTS

| | | | | |
|---|---|---|---|---|
| 2024/0172250 | A1* | 5/2024 | Tiirola | H04W 72/0446 |
| 2024/0179689 | A1* | 5/2024 | Xiong | H04L 25/024 |
| 2024/0236996 | A1* | 7/2024 | Fukui | H04W 72/0446 |
| 2024/0323934 | A1* | 9/2024 | Seok | H04W 72/0446 |

FOREIGN PATENT DOCUMENTS

| | | | |
|---|---|---|---|
| CN | 112771930 | A | 5/2021 |
| WO | 2019113766 | A1 | 6/2019 |

OTHER PUBLICATIONS

Sharp, “Joint channel estimation for multi-slot PUSCH”, 3GPP TSG RAN WG1 #105-e, R1-2105642, e-Meeting, May 10-27, 2021, (9p).

The extended European search report issued in Application No. 21944634.1 dated Jun. 28, 2024, (10p).

International Search Report issued in Application No. PCT/CN2021/099793, dated Feb. 25, 2022, with English translation, (4p).

Ericsson, “Time window configuration procedure in LTE for NR measurements (E403)”, 3GPP TSG-RAN WG2 #101 R2-1802777 Athens, Greece, Feb. 26-Mar. 2, 2018, (3p).

ZTE, “Support for transmission in preconfigured UL resources for NB-LoT”, 3GPP TSG RAN WG1 Meeting #99 R1-1912417 Reno, USA, Nov. 18-22, 2019, (8p).

China Registered Patent, Office Action issue in Application No. 202180001823.4 dated on Jan. 27 2024 with English translation. (9P).

* cited by examiner

METHOD AND APPARATUS FOR DETERMINING TIME-DOMAIN WINDOW, AND USER EQUIPMENT, BASE STATION AND STORAGE MEDIUM

CROSS-REFERENCE TO RELATED APPLICATIONS

The present application is a national phase entry under 35 USC § 371 of International Application PCT/CN2021/099793, filed Jun. 11, 2021, the entire disclosures of which are incorporated herein by reference.

BACKGROUND

In Release 17 (R17), joint channel estimation is generally performed on a plurality of time slots with the same channel conditions to improve the channel estimation accuracy. The joint channel estimation is specifically: using a demodulation reference signal (DMRS) to perform channel estimation to obtain the estimation results, and using the estimation results to demodulate the data transmitted on each time slot in the time domain window.

In a related art, the plurality of time domain windows are generally divided into consecutive time slot segments, and each time domain window corresponds to a joint channel estimation. A method for determining the time domain window mainly includes: a starting time slot of the $n^{th}$ time domain window=time slot position of scheduling downlink control information (DCI)+k2+the number of time slots in the time domain window×(n−1), where, n=1, 2, . . . , N; N=the number of time slots in the consecutive time slot segment K+the number of time slots in the time domain window; k2 is the number of time slots for transmission delay. For example, assuming that the number of time slots K in the consecutive time slot segment is 13 and the number of time slots in the time domain window is 6, three time domain windows may be determined according to a time division duplex (TDD) time slot format, which are 6, 6 and 1 in order.

The number of time slots of the last time domain window determined by the method for determining the time domain window in the related art is far different from the number of time slots of other time domain windows, resulting in uneven distribution of time domain windows, which will affect estimation effect of the joint channel.

SUMMARY

Embodiments of the present disclosure provide a method for determining a time domain window, an apparatus for determining a time domain window, a user equipment, a base station, and a storage medium, to solve technical problems of uneven distribution of time domain windows caused by the method for determining time domain windows in related technologies.

In a first aspect, embodiments of the present disclosure provide a method for determining a time domain window. The method is performed by a user equipment (UE) and includes:

receiving indication information sent by a base station; and determining a time domain window based on the indication information.

In a second aspect, embodiments of the present disclosure provide a method for determining a time domain window. The method is performed by a base station and includes:

sending indication information to a UE; and determining a time slot window based on the indication information.

In a third aspect, embodiments of the present disclosure provide a communication device. The communication device includes:

a processor;

a memory; and a computer program stored in the memory.

The processor is configured to execute the computer program stored in the memory, to cause the device to execute the method in the first aspect of embodiments of the present disclosure.

In a fourth aspect, embodiments of the present disclosure provide a communication device. The communication device includes:

a processor;

a memory; and a computer program stored in the memory.

The processor is configured to execute the computer program stored in the memory, to cause the device to execute the method in the second aspect of embodiments of the present disclosure.

Additional aspects and advantages of the present disclosure will be set forth in part in the description which follows, and in part will be obvious from the description, or may be learned by practice of the disclosure.

BRIEF DESCRIPTION OF THE DRAWINGS

These above-mentioned and/or additional aspects and advantages of embodiments of the present disclosure will become apparent and more readily appreciated from the following descriptions made with reference to the drawings, in which:

FIG. 1 is a schematic flowchart of a method for determining a time domain window provided by an embodiment of the present disclosure;

DETAILED DESCRIPTION

Figure 2:
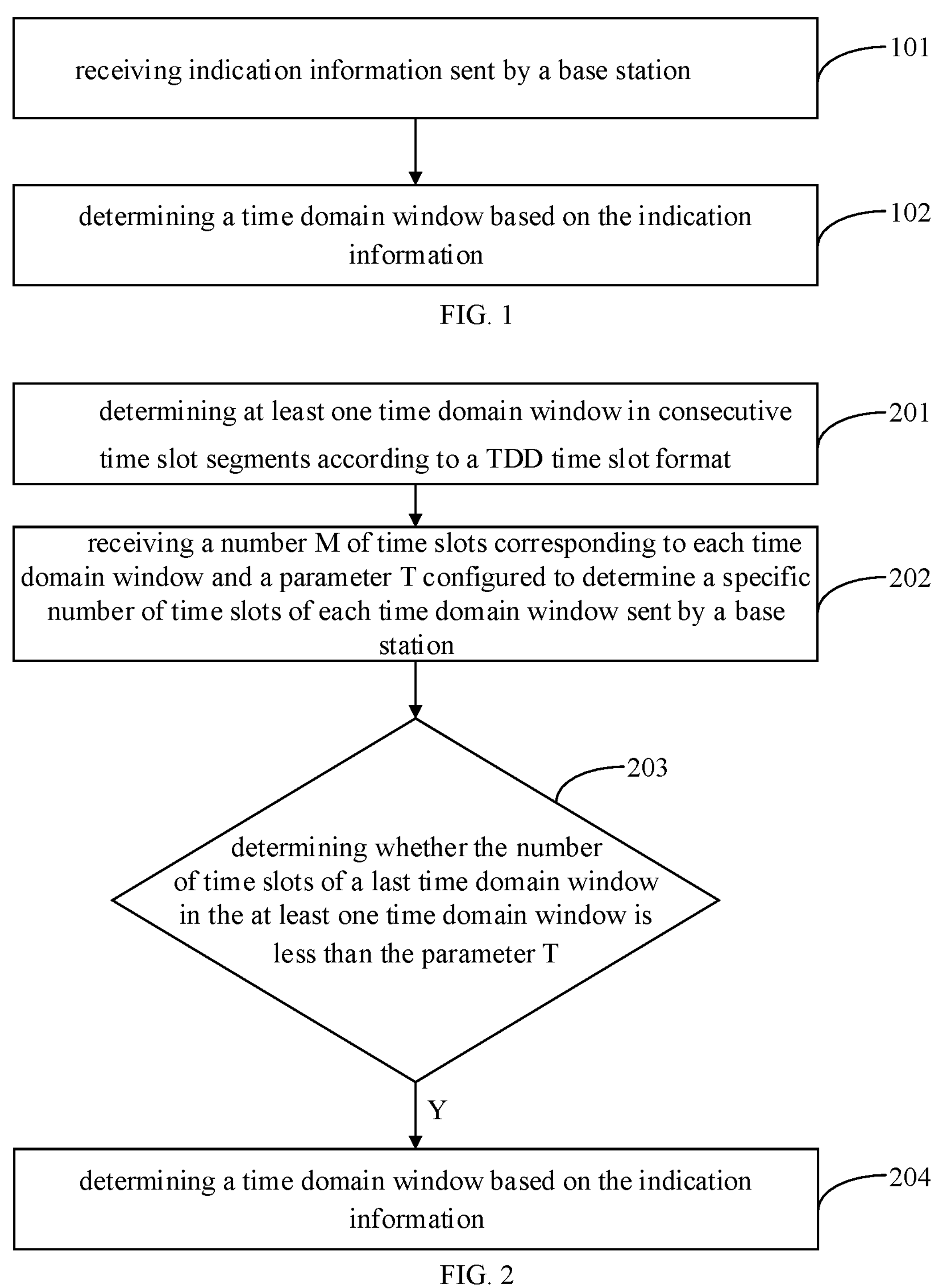
FIG. 2 is a schematic flowchart of a method for determining a time domain window provided by another embodiment of the present disclosure.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to embodiments of the disclosure as recited in the appended claims.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be understood that, although terms such as "first," "second" and "third" are used herein for describing various information, these information should not be limited by these terms. These terms are only used for distinguishing information of the same type. For example, first information may also be called second information, and similarly, the second information may also be called the first information, without departing from the scope of the present disclosure. As used herein, the term "if" may be construed to mean "when" or "upon" or "in response to determining" depending on the context.

Embodiments of the present disclosure are described in detail below, examples of which are illustrated in the drawings. The same or similar elements are denoted by same reference numerals in different drawings unless indicated otherwise. The embodiments described herein with reference to drawings are explanatory, and used to generally understand the present disclosure. The embodiments shall not be construed to limit the present disclosure.

In the method for determining the time domain window provided by embodiments of the present disclosure, the UE may receive the indication information sent by the base station and determine the time domain window based on the indication information. Moreover, the time slot numbers of each time domain window determined by the determination method in embodiments of the present disclosure have a small difference and are relatively close, so that the time domain window is evenly distributed, thereby ensuring the effect of joint channel estimation.

A method for determining a time domain window, an apparatus for determining a time domain window device, a user equipment, a base station and a storage medium provided by the present disclosure will be described in detail below with reference to the accompanying drawings.

FIG. 1 is a schematic flowchart of a method for determining a time domain window provided by an embodiment of the present disclosure. The method is performed by a user equipment (UE). As shown in FIG. 1, the method for determining the time domain window may include the following steps.

In step 101, instruction information sent by a base station is received.

It is noted that the methods in embodiments of the present disclosure may be applied to any UE. The UE may refer to a device that provides voice and/or data connectivity to users. The UE may communicate with one or more core networks via radio access network (RAN). The UE may be user equipment of an Internet of Things (IoT), such as a sensor device, a mobile phone (or called a cellular phone) and computers with IoT user equipment. For example, the user equipment may be fixed, portable, pocket, hand-held, computer built-in or vehicle-mounted devices. For example, the user equipment may be a station (STA), a subscriber unit, a subscriber station, a mobile station, a mobile, a remote station, an access point, a remote terminal, an access terminal, a user terminal, or a user agent. Alternatively, the UE may also be equipment of an unmanned aerial vehicle. Alternatively, the UE may also be a vehicle-mounted device, for example, a trip computer with a wireless communication function, or a wireless user device connected externally to the trip computer. Alternatively, the UE may also be a roadside device, for example, may be a street lamp, a signal lamp, or other roadside devices with a wireless communication function.

In an embodiment of the present disclosure, the indication information includes a number M of time slots and a parameter T configured to determine a specific number of time slots of each time domain window, where $M \geq T$, and M and T are positive integers. Values of M corresponding to individual time domain windows are the same. The M number of time slots is configured to determine the specific number of time slots and the parameter T of the each time domain window. It is noted that, in an embodiment of the present disclosure, the M number of time slots is used as a reference, and the number of time slots in each time domain window subsequently determined by the UE may not necessarily be the number M of time slots, or it may be is a number close to the number M of time slots, for example, it may be $M-1$ or $M-2$.

In another embodiment of the present disclosure, the indication information may include the number M of time slots.

In another embodiment of the present disclosure, the indication information may include a parameter H configured to calculate the number M of time slots corresponding to each time domain window, where H is a positive integer.

In step 102, a time domain window is determined based on the indication information.

In an embodiment of the present disclosure, when the contents included in the indication information are different, the methods for the UE to determine the time domain window based on the indication information are also different.

Specifically, in an embodiment of the present disclosure, when the indication information includes the number M of time slots corresponding to each time domain window, the method for the UE to determine the time domain window based on the indication information may be: the UE first determining the parameter T, and then determining the time domain window based on the number M of time slots and the parameter T. In an embodiment of the present disclosure, the method for the UE to determine the parameter T may include: the UE determining the parameter T based on a protocol agreement. In another embodiment of the present disclosure, the method for the UE to determine the parameter T may include: the UE determining the parameter T based on the number M of time slots. In an embodiment of the present disclosure, the method for the UE to determine the parameter T based on the number M of time slots may include: T=floor(M÷2), where a floor function is a downward rounding function.

In another embodiment of the present disclosure, when the indication information includes the number M of time slots and the parameter T corresponding to each time domain window, the method for the UE to determine the time domain window based on the indication information may be: the UE directly determining the time domain window based on the number M of the time slot and the parameter T.

In another embodiment of the present disclosure, when the indication information includes the parameter H, the method for the UE to determine the time domain window based on the indication information may be: the UE first calculating the number M of time slots based on the parameter H, determining the parameter T, and then determining the time domain window based on the number M of time slots and the parameter T. In one embodiment of the present disclosure, the method for the UE to determine the number M of time slots based on the parameter H may include: M=floor(a number of time slots in consecutive time slot segments÷H). The consecutive time slot segment is a time slot segment used to divide the time domain window. In addition, the method for the UE to determine the parameter T may refer to the above-mentioned description, which will not be described in detail here in embodiments of the present disclosure.

Furthermore, in an embodiment of the present disclosure, the method of "determining the time domain window based on the number M of time slots and the parameter T" may include the following manners.

Manner 1:

In step 1, a basic value j is determined, and j=0.

In step 2, it is determined whether the number K of time slots included in the consecutive time slot segment is greater than M+T. When K is greater than M+T, a step 3 is performed, and when K is not greater than M+T, a step 4 is performed.

In step 3, the number of time slots in the $(1+j)^{th}$ time domain window is determined as M, the value of K is re-determined as K−M, and the value of j is re-determined as j+1. The step 2 is performed.

In step 4, it is determined whether K is greater than M. When K is greater than M, the number of time slots in the $(1+j)^{th}$ time domain window is determined as ceil(K−2), where the ceil function is an upward rounding function, and the number of time slots in the $(1+j+1)^{th}$ time domain window is determined as K-ceil(K÷2). When K is less than or equal to M, the number of time slots in the $(1+j)^{th}$ time domain window is determined as K.

Illustratively, the specific process of the above-mentioned steps 1 to 4 will be described with examples.

In an embodiment of the present disclosure, it is assumed that the number of time slots included in the consecutive time slot segment is K=13, the number M of time slots=6, and the parameter T=2. The basic value is first determined as j=0, at this time K=13, M+T=6+2=8. Then, it is determined that K>M+T, and the number of time slots in the first time domain window is determine as 6, and j=1, K=13−6=7. It is determined that K=7 is not greater than M+T=8 and greater than M=6, and then the number of time slots in the second time domain window is determined as ceil(K÷2) =ceil(7÷2)=4, and the number of time slots in the third time domain window is determined as K−ceil(K÷2)=7−ceil(7÷2) =3.

Therefore, the consecutive time slot segment is divided into three time domain windows, and the number of time slots of the three time domain windows is 6, 4 and 3 in sequence. Compared to the method for determining the time-domain window in related art, the number of time slots for the three time domain windows determined in sequence is 6, 6 and 1, the number of time slots of each time slot window determined by the method for determining the time slot window in embodiments of the present disclosure is 6, 4 and 3, which are relatively close, and has a relatively uniform distribution.

In addition, in another embodiment of the present disclosure, the method of "determining the time domain window based on the number M of time slots and the parameter T" may include the following manner.

Manner 2:

In step a, a basic value j is determined, j=0.

In step b, it is determined whether K is greater than M+T. When K is greater than M+T, a step c is performed, and when K is not greater than M+T, a step d is performed.

In step c, the number of time slots in the $(1+j)^{th}$ time domain window is determined as M−f, where f is an integer, 0<f≤M, the K value is re-determined as K-M and the j value is re-determined as j+1; then the step b is performed.

In step d, it is determined whether K is greater than M. When K is greater than M, the number of time slots of the $(1+j)^{th}$ time domain window is determined as ceil(K−2), and the time slot of the $(1+j+1)^{th}$ time domain window is determine as K−ceil(K−2). When K is less than or equal to M, the number of time slots in the $(1+j)^{th}$ time domain window is determined as K.

Illustratively, the specific process of the above-mentioned step a to step d will be described with examples.

In an embodiment of the present disclosure, it is assumed that the number K of time slots included in the consecutive time slot segment=13, the number M of time slots=6, the parameters T=2, and f=1. A basic value is first determined as j=0, and the same time, K=13, M+T=6+2=8, then it is determined that K>M+T. The number of time slots in the first time domain window is determined as M−f=6−1=5, and j=1, K=13−5=8, then it is determined that K=8 is not greater than M+T=8 and is greater than M=6. The number of time slots in the second time domain window is determined as ceil(K÷2)=ceil(8÷2)=4. The number of time slots in the third time domain window is determined as K−ceil(K÷2)=8−ceil (8÷2)=4.

Therefore, the consecutive time slot segment is divided into three time domain windows, and the time slot numbers of the three time domain windows are 5, 4, and 4 in sequence. Compared to the method for determining the time domain window in related art, the number of time slots for the three time domain windows determined is: 6, 6 and 1 in sequence. The number of time slots in each time slot window determined by the method for determining the time slot window of embodiments of the present disclosure is 5, 4 and 4, which are relatively close.

To sum up, in the method for determining the time domain window provided by embodiments of the present disclosure, the UE receives the indication information sent by the base station and determines the time domain window based on the indication information. Moreover, the time slot numbers of each time domain window determined by the determination method in embodiments of the present disclosure have a small difference and are relatively close, so that the time domain window is evenly distributed, thereby ensuring the estimation effect of joint channel.

FIG. 2 is a schematic flowchart of a method for determining a time domain window provided by another embodiment of the present disclosure. The method is executed by a UE. As shown in FIG. 2, the method for determining the time domain window may include the following steps.

In step 201, at least one time domain window in consecutive time slot segments is determined according to a time division duplex (TDD) time slot format.

In an embodiment of the present disclosure, the method of determining at least one time domain window in the consecutive time slot segment according to the TDD time slot format in this step may be specifically the method of determining the time domain window in the relevant art, which may be referred to in the description of the background technology mentioned above. For example, the number of time slots in three time domain windows determined in the consecutive time slot segment containing 13 time slots using the TDD time slot format may be 6, 6 and 1.

In step 202, a number M of time slots and a parameter T sent by a base station are received. The number M of time slots correspond to each time domain window, and the parameter T is configured to determine a specific number of time slots of the each time domain window.

In step 203, it is determined whether the number of time slots in a last time domain window in at least one time domain window on the consecutive time slot segment is less than the parameter T.

In an embodiment of the present disclosure, when it is determined that the number of time slots of the last time domain window in the at least one time domain window is less than the parameter T, it means that the number of time slots of the last time domain window is quite different from the number of time slots in other time domain windows. That is, the time domain windows are unevenly distributed. In this case, step 204 needs to be performed. When it is determined that the number of time slots in the last time domain window in the at least one time domain window is not less than the parameter T, the operation is stopped.

In step 204, the time domain window is determined based on the indication information.

In an embodiment of the present disclosure, determining the time domain window based on the indication information in this step mainly determines the time domain window based on the number M of time slots and the parameter T in the indication information.

Furthermore, in an embodiment of the present disclosure, the method of determining the time domain window based on the number M of time slots and the parameter T may include: adjusting a number of time slots of last S time domain windows in the at least one time domain window based on the number M of time slots and the parameter T to obtain S adjusted time domain windows, where S is a positive integer. A difference between a number of time slots in each adjusted time domain window and a number of time slots in each unadjusted time domain window is less than a first threshold. S may be between [2, 3], and the first threshold may be between [1, 3].

Specifically, in an embodiment of the present disclosure, the method for obtaining S adjusted time domain windows may be the manner 1 in the above-mentioned embodiment, that is, step 1 to step 4.

Referring to the examples of step 1 to step 4 in the above-mentioned embodiments, it may be seen that the consecutive time slot segment is divided into three time domain windows, and the number of time slots in the three time domain windows is 6, 4 and 3 in sequence. Compared with the number of time slots of the three time domain windows determined in step 202 of 6, 6 and 1, it is equivalent to adjust only the number of time slots of the last two time domain windows.

In addition, in another embodiment of the present disclosure, the method for determining the time domain window based on the indication information may include: the UE directly re-determining at least one new time slot in the consecutive time slot segment based on the number M of time slots and the parameter T. The difference between the number of time slots of any two new time domain windows in the at least one new time domain window is less than the first threshold, and the first threshold may be, for example, between [1, 3].

The method of re-determining at least one new time domain window in the consecutive time slot segment based on the number M of time slots and the T may be the manner 2 in the above-mentioned embodiment, that is, step a to step d.

Referring to the example of the method from step a to step d in the above embodiment, it may be seen that the consecutive time slot segment is divided into three time domain windows, and the number of time slots in the three time domain windows is 5, 4 and 4 in sequence. Compared to the number of time slots 6, 6 and 1 determined in step 202 for the three time domain windows, it is equivalent to adjust the number of time slots for each time domain window, that is, redefining three new time domain windows.

To sum up, in the method for determining the time domain window provided by the embodiments of the present disclosure, the UE will receive the indication information sent by the base station and determine the time domain window based on the indication information. Moreover, the time slot numbers of each time domain window determined by the determination method in embodiments of the present disclosure have a small difference and are relatively close, so that the time domain window is evenly distributed, thereby ensuring the estimation effect of the joint channel.

Figure 3:
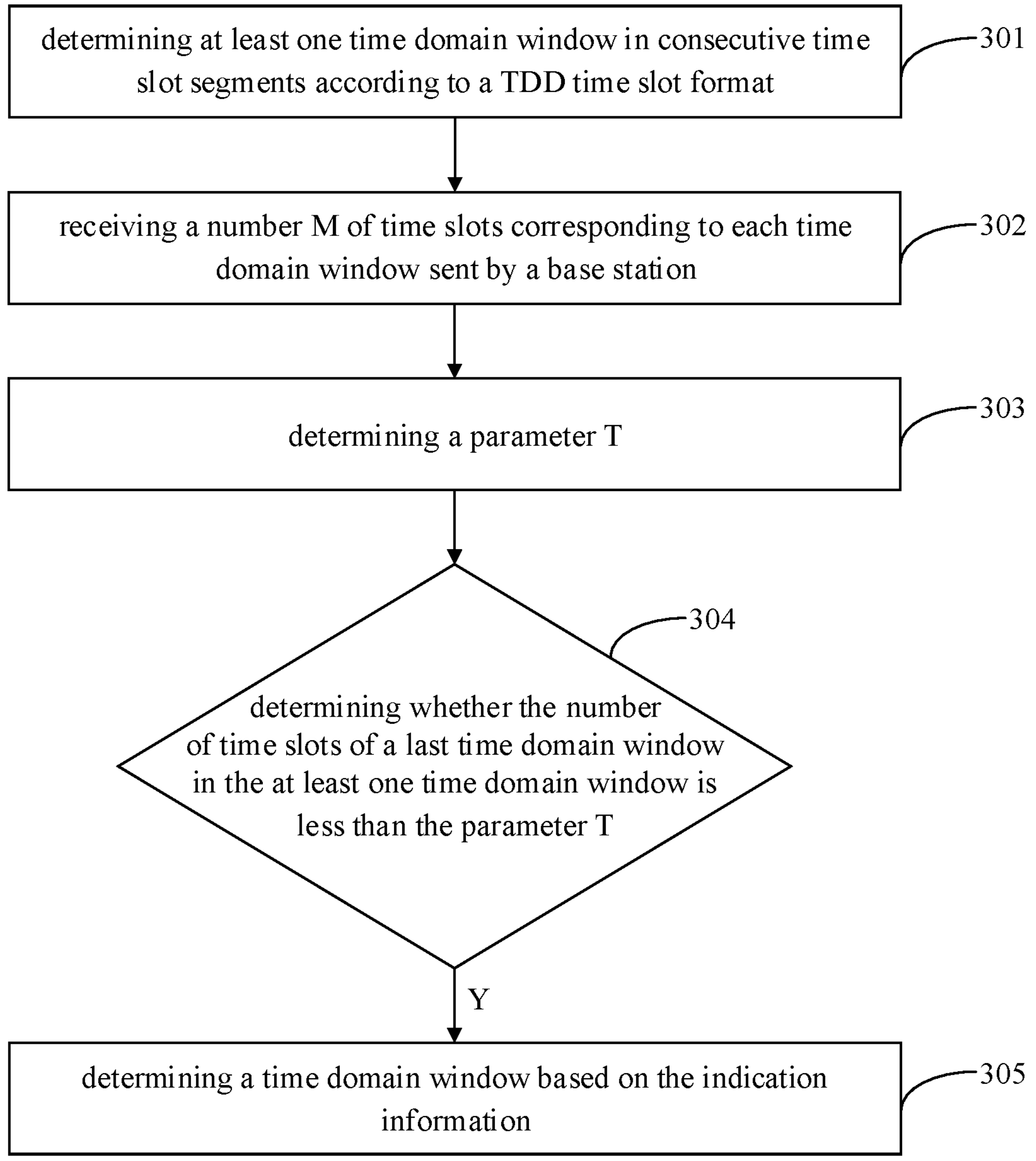
FIG. 3 is a schematic flowchart of a method for determining a time domain window provided by another embodiment of the present disclosure.

FIG. 3 is a schematic flowchart of a method for determining a time domain window provided by another embodiment of the present disclosure. The method is executed by the UE. As shown in FIG. 3, the method for determining the time domain window may include the following steps.

In step 301, at least one time domain window in the consecutive time slot segment is determined according to a TDD time slot format.

In step 302, a number M of time slots corresponding to each time domain window sent by a base station is received.

In step 303, a parameter T is determined.

In step 304, it is determined whether the number of time slots in a last time domain window in at least one time domain window in the consecutive time slot segment is less than the parameter T. If it is less than the parameter T, a step 305 is performed; otherwise, the operation is stopped.

In step 305, the time domain window is determined based on the indication information.

For detailed introduction to step 301 to step 305, reference may be made to the above-mentioned embodiments, and embodiments of the present disclosure will not be described in detail here.

To sum up, in the method for determining the time domain window provided by embodiments of the present disclosure, the UE receives the indication information sent by the base station and determines the time domain window based on the indication information. Moreover, the time slot numbers of each time domain window determined by the determination method in embodiments of the present disclosure have a small difference and are relatively close, so that the time domain window is evenly distributed, thereby ensuring the estimation effect of the joint channel.

Figures 4, 5:
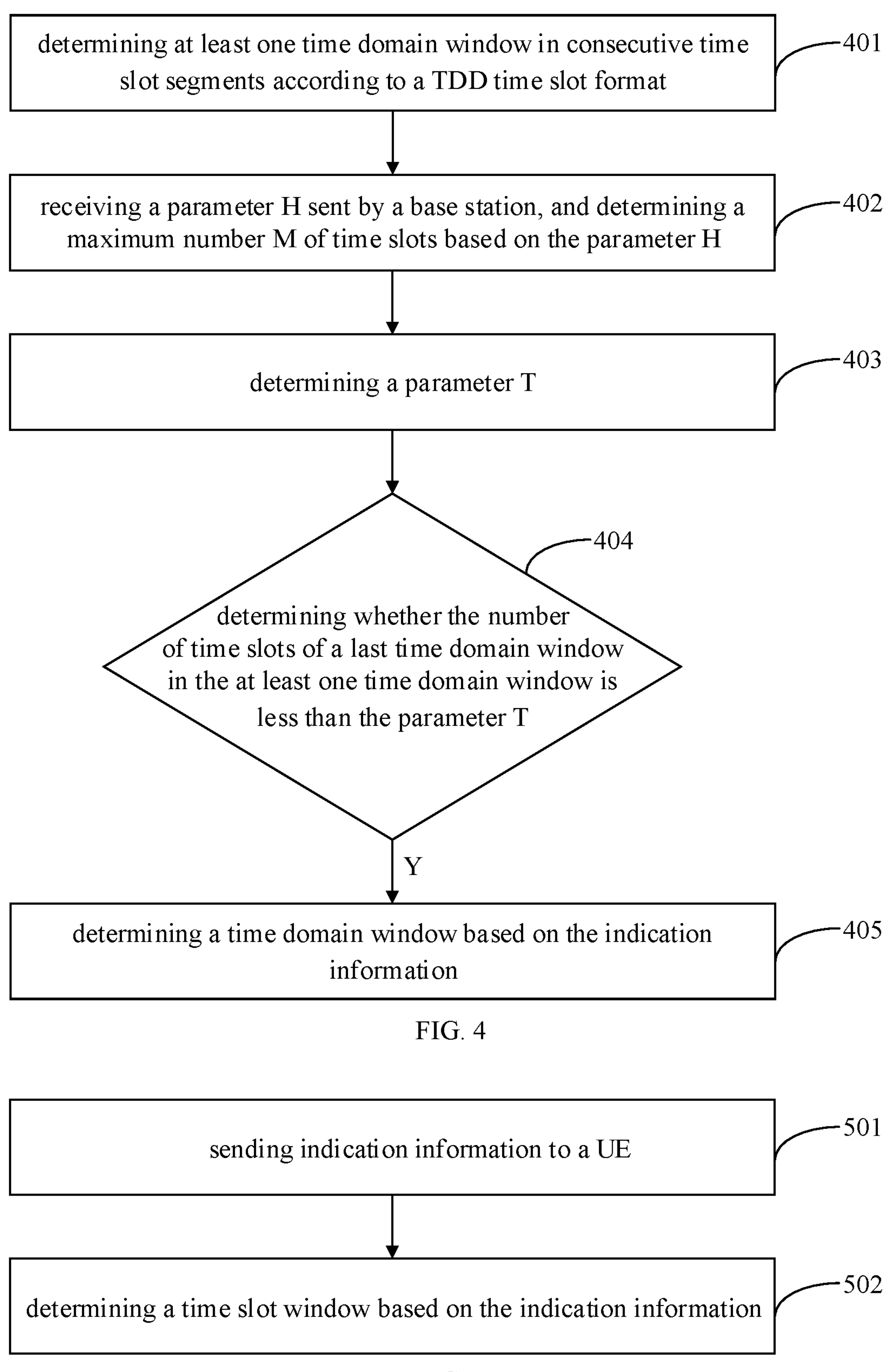
FIG. 4 is a schematic flowchart of a method for determining a time domain window provided by another embodiment of the present disclosure.
FIG. 5 is a schematic flowchart of a method for determining a time domain window provided by another embodiment of the present disclosure.

FIG. 4 is a schematic flowchart of a method for determining a time domain window provided by another embodiment of the present disclosure. The method is executed by a UE. As shown in FIG. 4, the method for determining the time domain window may include the following steps.

In step 401, at least one time domain window in the consecutive time slot segment is determined according to a TDD time slot format.

In step 402, a parameter H sent by abase station is received, and the number M of time slots is determined based on the parameter H.

In step 403, a parameter T is determined.

In step 404, it is determined whether the number of time slots in a last time domain window in at least one time domain window on the consecutive time slot segment is less than the parameter T. If it is less than the parameter T, a step 305 is performed; otherwise, the operation is stopped.

In step 405, the time domain window is determined based on the indication information.

For detailed introduction to step 401 to step 405, reference may be made to the above-mentioned embodiments, and embodiments of the present disclosure will not be described in detail here.

To sum up, in the method for determining the time domain window provided by embodiments of the present disclosure, the UE receives the indication information sent by the base station and determines the time domain window based on the indication information. Moreover, the time slot numbers of each time domain window determined by the determination method in embodiments of the present disclosure have a small difference and are relatively close, so that the time domain window is evenly distributed, thereby ensuring the estimation effect of the joint channel.

FIG. 5 is a schematic flowchart of a method for determining a time domain window provided by another embodiment of the present disclosure. The method is executed by a base station. As shown in FIG. 5, the method for determining the time domain window may include the following steps.

In step 501, indication information is sent to the UE.

For detailed introduction to the indication information, reference may be made to the above-mentioned embodiments, and embodiments of the present disclosure will not be described in detail here.

In step 502, a time slot window is determined based on the indication information.

It is noted that in an embodiment of the present disclosure, the method for the base station to determine the time slot window based on the indication information is the same as the method for the UE to determine the time slot window based on the indication information. That is, the number of time slots in each time domain window determined by the base station is consistent with the number of time slots in the time domain window determined by the UE, thereby ensuring that the base station and the UE may transmit and receive in the same time period.

Based on this, for a detailed description of the base station determining the time slot window based on the indication information in this step, reference may be made to the above embodiments, and embodiments of the present disclosure will not be described in detail here.

To sum up, in the method for determining the time domain window provided by the embodiments of the present disclosure, the base station will send indication information to the UE, so that the UE determines the time domain window based on the indication information. At the same time, the base station will also determine the time domain window based on the indication information. Moreover, the time slot numbers of each time domain window determined by the determination method in embodiments of the present disclosure have a small difference and are relatively close, so that the time domain window is evenly distributed, thereby ensuring the estimation effect of the joint channel.

Figure 6:
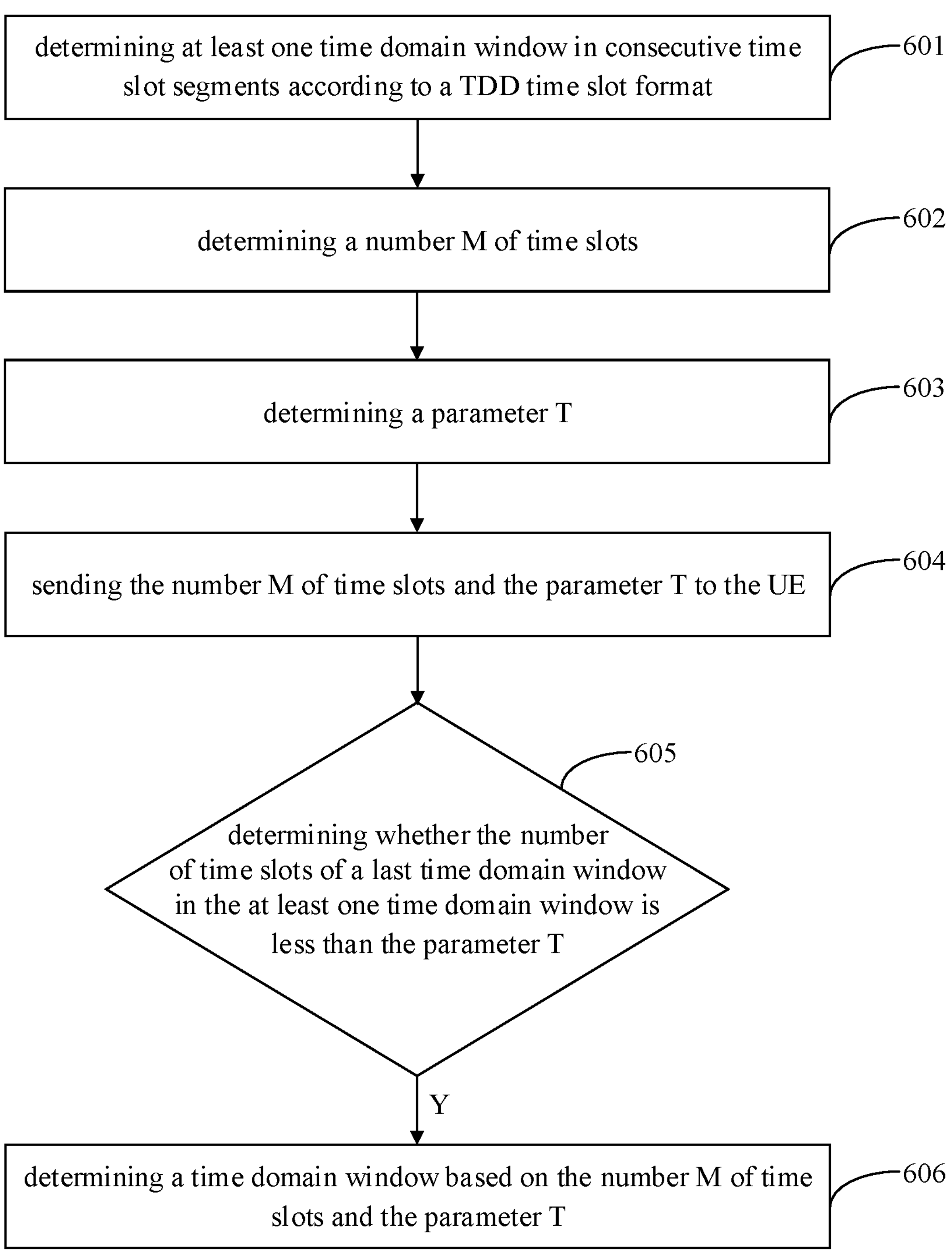
FIG. 6 is a schematic flowchart of a method for determining a time domain window provided by another embodiment of the present disclosure.

FIG. 6 is a schematic flowchart of a method for determining a time domain window provided by another embodiment of the present disclosure. The method is executed by a base station. As shown in FIG. 6, the method for determining a time domain window may include the following steps.

In step 601, at least one time domain window in a consecutive time slot segment is determined according to a TDD time slot format.

In an embodiment of the present disclosure, the method of determining at least one time domain window in the consecutive time slot segment according to the TDD time slot format in this step is specifically a method for determining a time domain window in the related art. For details, reference may be made to the description in the background technology mentioned above For example, the number of time slots in three time domain windows determined in the consecutive time slot segment containing 13 time slots using the TDD time slot format may be 6, 6 and 1.

In step 602, a number M of time slots is determined.

In an embodiment of the present disclosure, the method for the base station to determine the number M of time slots may include: the base station first determining the parameter H, and then determining the number M of time slots based on the parameter H.

In an embodiment of the present disclosure, the method for the base station to determine the parameter H may include: determining the parameter H based on the capability of the UE. In another embodiment of the present disclosure, the method for the base station to determine the parameter H may include: determining the parameter H based on the time slot format of the UE.

In an embodiment of the present disclosure, the method for the base station to determine the number M of time slots based on the parameter H may include: M=floor (the number of time slots in the consecutive time slot segment÷H).

In step 603, a parameter T is determined.

In an embodiment of the present disclosure, the method for the base station to determine the parameter T may include: determining the parameter T based on a protocol agreement. In another embodiment of the present disclosure, a method for the base station to determine the parameter T may include: determining the parameter T based on the number M of time slots. In an embodiment of the present disclosure, the method of determining the parameter T based on the number M of time slots may include: T=floor(M÷2).

In step 604, the number M of time slots and a parameter T are sent to the UE.

In step 605, it is determined whether the number of time slots in the last time domain window in at least one time domain window on the consecutive time slot segment is less than the parameter T. If it is less than the parameter T, a step 606 is performed; otherwise, the operation is stopped.

In an embodiment of the present disclosure, when it is determined that the number of time slots of the last time domain window in the at least one time domain window is less than the parameter T, it means that the number of time slots of the last time domain window is quite different from the number of time slots in other time domain windows, that is, the time domain windows are unevenly distributed. In this case, step 606 needs to be performed. When it is determined that the number of time slots in the last time domain window in the at least one time domain window is not less than the parameter T, the operation is stopped.

In step 606, the time slot window is determined based on the number M of time slots and the parameter T.

For detailed introduction to step 606, reference may be made to the above embodiments, and embodiments of the present disclosure will not be described in detail here.

To sum up, in the method for determining the time domain window provided by embodiments of the present disclosure, the base station will send indication information to the UE, so that the UE determines the time domain window based on the indication information. At the same time, the base station will also determine the time domain window based on the indication information. Moreover, the time slot numbers of each time domain window determined by the determination method in embodiments of the present disclosure have a small difference and are relatively close, so that the time domain window is evenly distributed, thereby ensuring the estimation effect of the joint channel.

Figure 7:
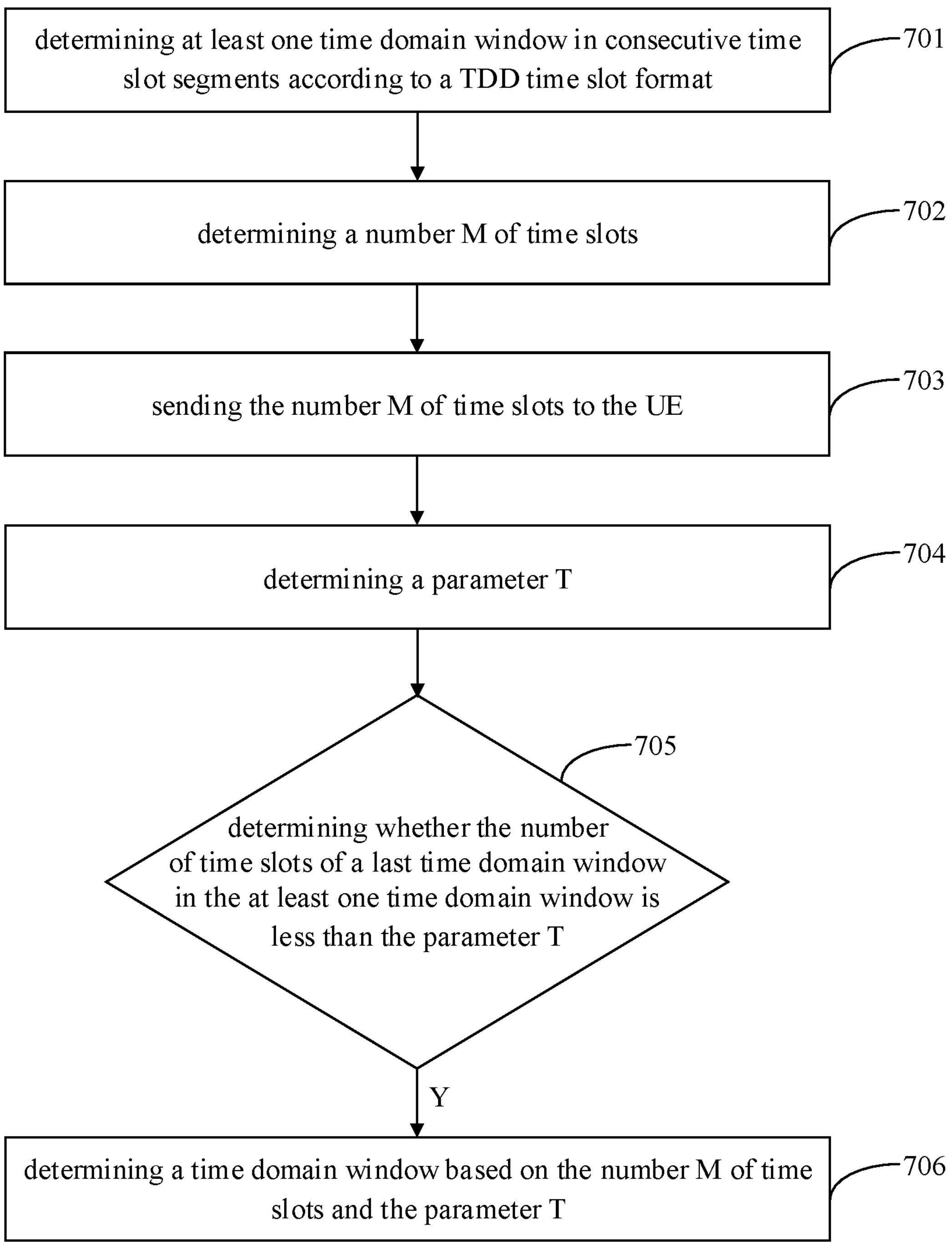
FIG. 7 is a schematic flowchart of a method for determining a time domain window provided by another embodiment of the present disclosure.

FIG. 7 is a schematic flowchart of a method for determining a time domain window provided by another embodiment of the present disclosure. The method is executed by a base station. As shown in FIG. 7, the method for determining a time domain window may include the following steps.

In step 701, at least one time domain window in the consecutive time slot segment is determined according to the TDD time slot format.

In step 702, the number M of time slots is determined.

In step 703, the number M of time slots is sent to the UE.

In step 704, a parameter T is determined.

In step 705, it is determined whether the number of time slots in the last time domain window in at least one time domain window on the consecutive time slot segment is less than the parameter T. If it is less than the parameter T, a step 706 is performed; otherwise, the operation is stopped.

In step 706, the time slot window is determined based on the number M of time slots and the parameter T.

For detailed introduction to step 701 to step 706, reference may be made to the above-mentioned embodiments, and embodiments of this disclosure will not be described in detail here.

To sum up, in the method for determining a time domain window provided by the embodiments of the present disclosure, the base station will send indication information to the UE, so that the UE determines the time domain window based on the indication information. At the same time, the base station will also determine the time domain window based on the indication information. Moreover, the time slot numbers of each time domain window determined by the determination method in the embodiment of the present disclosure have a small difference and are relatively close, so that the time domain window is evenly distributed, thereby ensuring the estimation effect of the joint channel.

Figure 8:
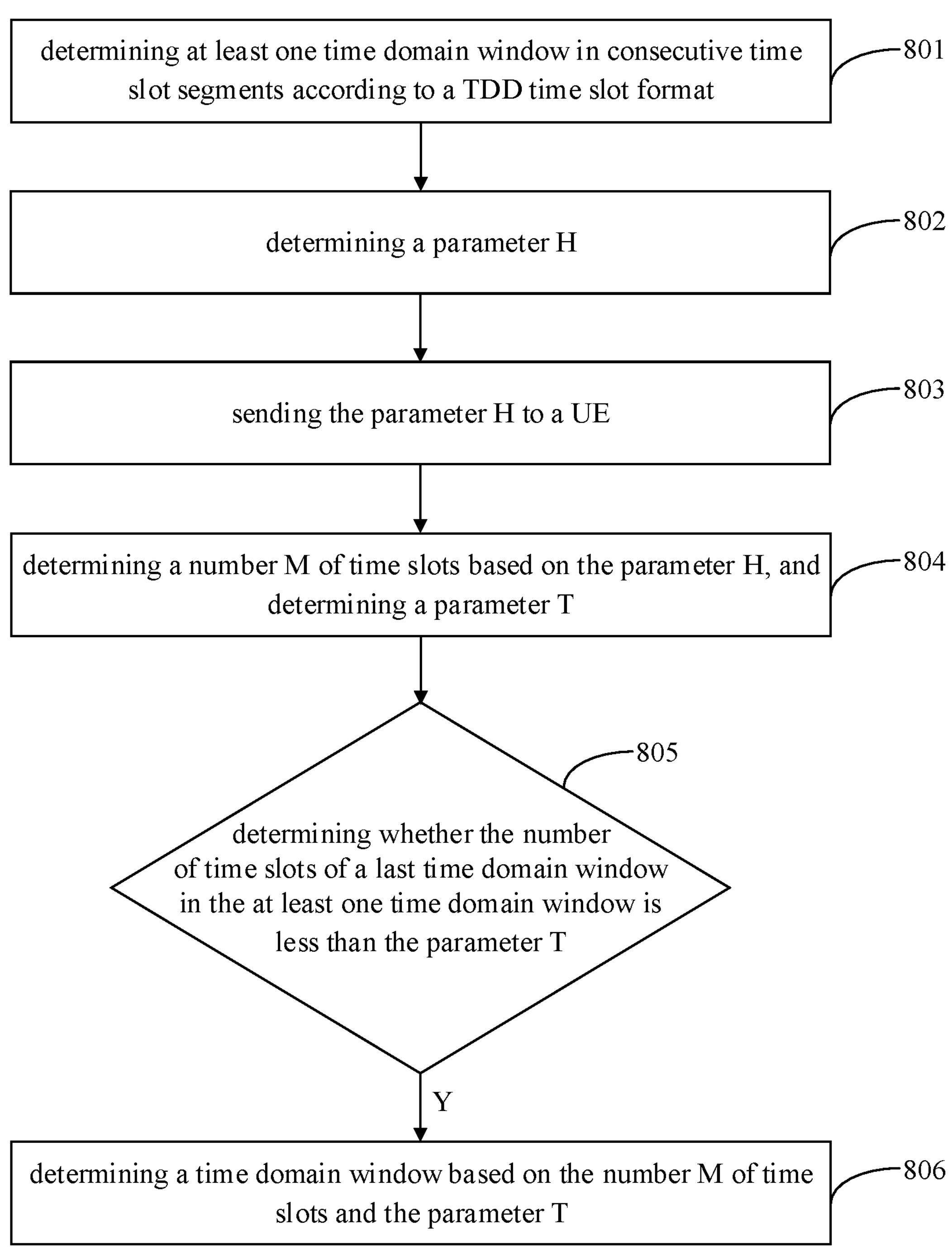
FIG. 8 is a schematic flowchart of a method for determining a time domain window provided by another embodiment of the present disclosure.

FIG. 8 is a schematic flowchart of a method for determining a time domain window provided by another embodiment of the present disclosure. The method is executed by a base station. As shown in FIG. 8, the method for determining a time domain window may include the following steps.

In step 801, at least one time domain window in a consecutive time slot segment is determined according to a TDD time slot format.

In step 802, a parameter H is determined.

In an embodiment of the present disclosure, the method for the base station to determine the parameter H may include: determining the parameter H based on the capability of the UE. In another embodiment of the present disclosure, the method for the base station to determine the parameter H may include: determining the parameter H based on the time slot format of the UE.

In step 803, a parameter H is sent to the UE.

In step 804, the number M of time slots is determined based on the parameter H, and a parameter T is determined.

In an embodiment of the present disclosure, the method for the base station to determine the number M of time slots based on the parameter H may include: M=floor (the number of time slots in the consecutive time slot segment÷H).

In addition, the method for the base station to determine the parameter T may be described with reference to the above-mentioned embodiments, and embodiments of the present disclosure will not be described in detail here.

In step 805, it is determined whether the number of time slots in a last time domain window in at least one time domain window in the consecutive time slot segment is less than the parameter T. If it is less than the parameter T, a step 806 is performed, otherwise, the operation is stopped.

In step 806, the time slot window is determined based on the number M of time slots and the parameter T.

For detailed introduction to step 801 to step 806, reference may be made to the above embodiments, and the embodiments of the present disclosure will not be described in detail here.

To sum up, in the method for determining the time domain window provided by the embodiments of the present disclosure, the base station will send indication information to the UE, so that the UE determines the time domain window based on the indication information. At the same time, the base station will also determine the time domain window based on the indication information. Moreover, the time slot numbers of each time domain window determined by the determination method in the embodiment of the present disclosure have a small difference and are relatively close, so that the time domain window is evenly distributed, thereby ensuring the estimation effect of the joint channel.

Figure 9:
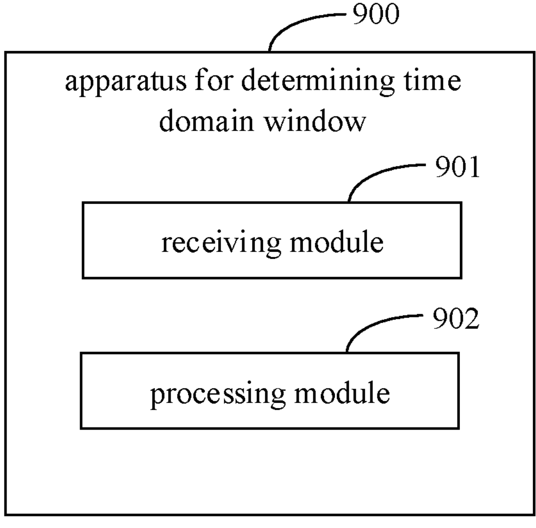
FIG. 9 is a schematic diagram of an apparatus for determining a time domain window provided by an embodiment of the present disclosure.

FIG. 9 is a schematic diagram of an apparatus for determining a time domain window provided by an embodiment of the present disclosure. As shown in FIG. 9, the apparatus for determining the time domain window may include:

- a receiving module 901 configured to receive instruction information sent by a base station;
- a processing module 902 configured to determine a time domain window based on the indication information.

To sum up, in the apparatus for determining the time domain window provided by embodiments of the present disclosure, the UE receives the indication information sent by the base station and determines the time domain window based on the indication information. Moreover, the time slot numbers of each time domain window determined by the determination method in the embodiment of the present disclosure have a small difference and are relatively close, so that the time domain window is evenly distributed, thereby ensuring the estimation effect of the joint channel.

Alternatively, in an embodiment of the present disclosure, the indication information includes a number M of time slots and a parameter T configured to determine a specific number of time slots of each time domain window, where M≥T. Values of M corresponding to individual time domain windows are the same, and M and T are positive integers; or

- the indication information includes the number M of time slots; or
- the indication information includes a parameter H configured to calculate the number M of time slots, where H is a positive integer.

Alternatively, in another embodiment of the present disclosure, the indication information includes the parameter H configured to calculate the number M of time slots, where H is a positive integer. The apparatus further is configured to determine the number M of time slots based on the parameter H;

determine the parameter T based on the number M of time slots.

Alternatively, in another embodiment of the present disclosure, the apparatus is further configured for:

M=floor (a number of time slots in consecutive time slot segments÷H), where a floor function is a downward rounding function.

Alternatively, in another embodiment of the present disclosure, the indication information includes the number M of time slots. The apparatus is further configured to:

determine the parameter T based on the number M of time slots.

Alternatively, in another embodiment of the present disclosure, the apparatus is further configured for:

T=floor (M÷2), where a floor function is a downward rounding function.

Alternatively, in another embodiment of the present disclosure, the apparatus is further configured to:

determine at least one time domain window in consecutive time slot segments according to a time division duplex (TDD) time slot format.

Alternatively, in another embodiment of the present disclosure, the processing module is further configured to:

re-determine at least one new time domain window on the consecutive time slot segments based on the number M of time slots and the parameter T when the number of time slots of a last time domain window in the at least one time domain window is less than the parameter T, in which a difference in a number of time slots of any two new time domain windows is less than a first threshold.

Alternatively, in another embodiment of the present disclosure, the processing module is further configured to:

adjust a number of time slots of last S time domain windows in the at least one time domain window based on the number M of time slots and the parameter T to obtain S adjusted time domain windows when a number of time slots of a last time domain window in the at least one time domain window is less than the parameter T, where S is a positive integer; in which a difference between a number of time slots in each adjusted time domain window and a number of time slots in each unadjusted time domain window is less than a first threshold.

Figure 10:
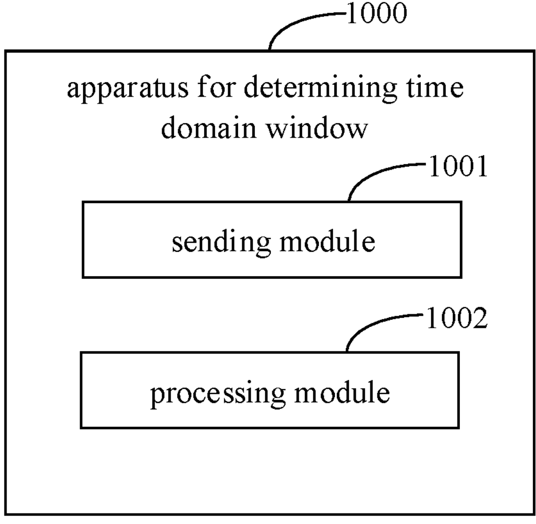
FIG. 10 is a schematic diagram of an apparatus for determining a time domain window provided by another embodiment of the present disclosure.

FIG. 10 is a schematic diagram of a communication device provided by an embodiment of the present disclosure. As shown in FIG. 9, the apparatus for determining a time domain window may include:

a sending module 1001 configured to send indication information to a UE;

a processing module 1002 configured to determine a time slot window based on the indication information.

To sum up, in the apparatus for determining the time domain window provided by the embodiment of the present disclosure, the base station will send indication information to the UE, so that the UE determines the time domain window based on the indication information. At the same time, the base station will also determine the time domain window based on the indication information. Moreover, the time slot numbers of each time domain window determined by the determination method in the embodiment of the present disclosure have a small difference and are relatively close, so that the time domain window is evenly distributed, thereby ensuring the estimation effect of the joint channel.

Alternatively, in an embodiment of the present disclosure, the indication information includes a number M of time slots and a parameter T configured to determine a specific number of time slots of each time domain window, where M≥T. Values of M corresponding to individual time domain windows are the same, and M and T are positive integers; or the indication information includes the number M of time slots; or the indication information includes a parameter H configured to calculate the number M of time slots, where H is a positive integer.

Alternatively, in another embodiment of the present disclosure, the apparatus further is configured to:

determine the parameter H based on a capability of the UE or a time slot format of the UE;

determine the number M of time slots based on the parameter H;

determine the parameter T based on the number M of time slots.

Alternatively, in another embodiment of the present disclosure, the apparatus is further configured for:

M=floor (a number of time slots in consecutive time slot segments÷H).

Alternatively, in another embodiment of the present disclosure, the apparatus is further configured to:

determine the parameter T based on the number M of time slots.

Alternatively, in another embodiment of the present disclosure, the apparatus is further configured for:

$$T = \text{floor}(M \div 2).$$

Alternatively, in another embodiment of the present disclosure, the apparatus is further configured to:

determine at least one time domain window in consecutive time slot segments according to a time division duplex (TDD) time slot format.

Alternatively, in another embodiment of the present disclosure, the processing module is further configured to:

re-determine at least one new time domain window on the consecutive time slot segments based on the number M of time slots and the parameter T when the number of time slots of a last time domain window in the at least one time domain window is less than the parameter T, in which difference in a number of time slots of any two new time domain windows is less than a first threshold.

Alternatively, in another embodiment of the present disclosure, the processing module is further configured to:

adjust a number of time slots of last S time domain windows in the at least one time domain window based on the number M of time slots and the parameter T to obtain S adjusted time domain windows when a number of time slots of a last time domain window in the at least one time domain window is less than the parameter T, where S is a positive integer; in which a difference between a number of time slots in each adjusted time domain window and a number of time slots in each unadjusted time domain window is less than a first threshold.

A computer storage medium provided by embodiments of the present disclosure stores an executable program. After the executable program is executed by a processor, the method shown in any one of FIG. 1 to 4 or 5 to 8 may be implemented.

In order to implement the above embodiments, the present disclosure also provides a computer program product, including a computer program that, when executed by a processor, implements the method shown in any one of FIG. 1 to 4 or 5 to 8.

In addition, in order to implement the above-mentioned embodiments, the present disclosure also provides a computer program that, when executed by a processor, implements the method shown in any one of FIG. 1 to 4 or 5 to 8.

Figure 11:
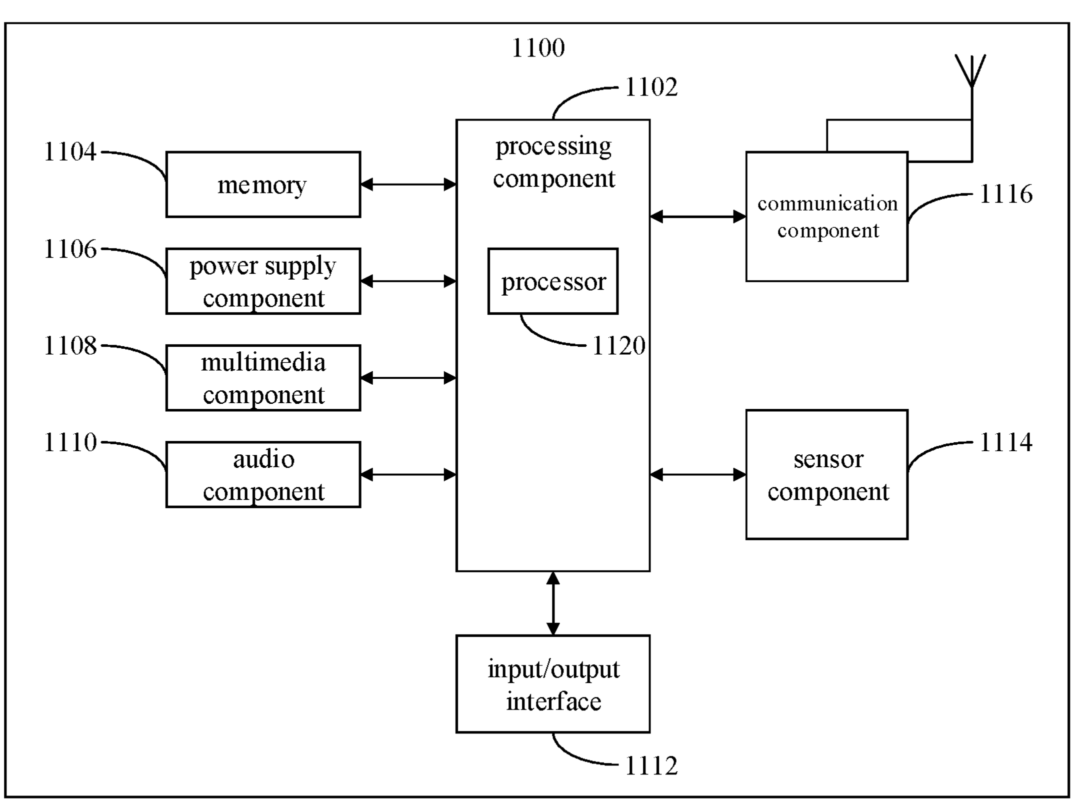
FIG. 11 is a block diagram of a user equipment provided by an embodiment of the present disclosure.

FIG. 11 is a block diagram of a user equipment (UE) 1100 provided by an embodiment of the present disclosure. For example, the UE 1100 may be a mobile phone, a computer, a digital broadcast terminal device, a messaging device, a game console, a tablet device, a medical device, a fitness device, a personal digital assistant, etc.

Referring to FIG. 11, the UE 1100 may include at least one of the following components: a processing component 1102, a memory 1104, a power supply component 1106, a multimedia component 1108, an audio component 1110, an input/output (I/O) interface 1112, a sensor component 1114, and a communication component 1116.

The processing component 1102 generally controls the overall operations of the UE 1100, such as the operations associated with display, telephone calls, data communications, camera operations, and recording operations. The processing component 1102 may include at least one processor 1120 to execute instructions to complete all or part of the steps of the above method. Additionally, the processing component 1102 may include at least one module to facilitate the interaction between the processing component 1102 and other components. For example, the processing component 1102 may include a multimedia module to facilitate the interaction between the multimedia component 1108 and the processing component 1102.

The memory 1104 is configured to store various types of data to support the operations at the UE 1100. Examples of such data include instructions for any application or methods operated on the UE 1100, contact data, phonebook data, messages, pictures, videos, etc. The memory 1104 may be implemented by using any type of volatile or non-volatile storage device, or a combination thereof, such as a static random access memory (SRAM), an electrically erasable programmable read-only memory (EEPROM), an erasable programmable read-only memory (EPROM), a programmable read only memory (PROM), a read-only memory (ROM), a magnetic memory, a flash memory, a magnetic or optical disk.

The power supply component 1106 provides power to various components of the UE 1100. The power supply components 1106 may include a power management system, at least one power supply, and any other components associated with the generation, management, and distribution of power in the UE 1100.

The multimedia component 1108 includes a screen that provides an output interface between the UE 1100 and the user. In some embodiments, the screen may include a liquid crystal display (LCD) and a touch panel (TP). If the screen includes a touch panel, the screen may be implemented as a touch screen to receive input signals from the user. The touch panel includes at least one touch sensor to sense touches, swipes, and gestures on the touch panel. The touch sensor may not only sense a boundary of a touch or a swipe action, but also sense awake time and a pressure associated with the touch or swipe action. In some embodiments, the multimedia component 1108 includes a front camera and/or a rear camera. The front camera and/or the rear camera may receive an external multimedia data while the UE 1100 is in an operation mode, such as a photographing mode or a video mode. Each of the front camera and the rear camera may be a fixed optical lens system or have focal and optical zoom capability.

The audio component 1110 is configured to output and/or input audio signals. For example, the audio component 1110 includes a microphone (MIC) configured to receive external audio signals when the UE 1100 is in an operation mode, such as a call mode, a recording mode and a voice recognition mode. The received audio signals may be further stored in the memory 1104 or transmitted via communications component 1116. In some embodiments, the audio component 1110 further includes a speaker to output audio signals.

The I/O interface 1112 provides an interface between the processing component 1102 and peripheral interface modules, such as keyboards, click wheels, buttons, and the like. These buttons may include, but are not limited to, a home button, a volume button, a starting button, and a locking button.

The sensor component 1114 includes at least one sensor to provide status assessments of various aspects of the UE 1100. For example, the sensor component 1114 may detect an open/closed status of the UE 1100, relative positioning of components, such as the display and keypad of the UE 1100, a change in position of the UE 1100 or a component of the UE 1100, a presence or absence of user contact with the UE 1100, an orientation or an acceleration/deceleration of the UE 1100, and a change in temperature of the UE 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an acceleration sensor, a gyroscope sensor, a magnetic sensor, a pressure sensor or a temperature sensor.

The communication component 1116 is configured to facilitate communication, wired or wireless, between the UE 1100 and other devices. The UE 1100 may access a wireless network based on a communication standard, such as WiFi, 2G or 3G, or a combination thereof. In illustrative embodiments, the communication component 1116 receives a broadcast signal or broadcast related information from an external broadcast management system via a broadcast channel. In illustrative embodiments, the communication component 1116 further includes a near field communication (NFC) module to facilitate short-range communication. For example, the NFC module may be implemented based on a radio frequency identification (RFID) technology, an infrared data association (IrDA) technology, an ultra wideband (UWB) technology, a Bluetooth (BT) technology and other technologies.

In illustrative embodiments, the UE 1100 may be implemented with one or more application specific integrated circuits (ASICs), digital signal processors (DSPs), digital signal processing devices (DSPDs), programmable logic devices (PLDs), field programmable gate arrays (FPGAs), controllers, microcontroller, microprocessors, or other electronic components, for performing the above-mentioned method.

Figure 12:
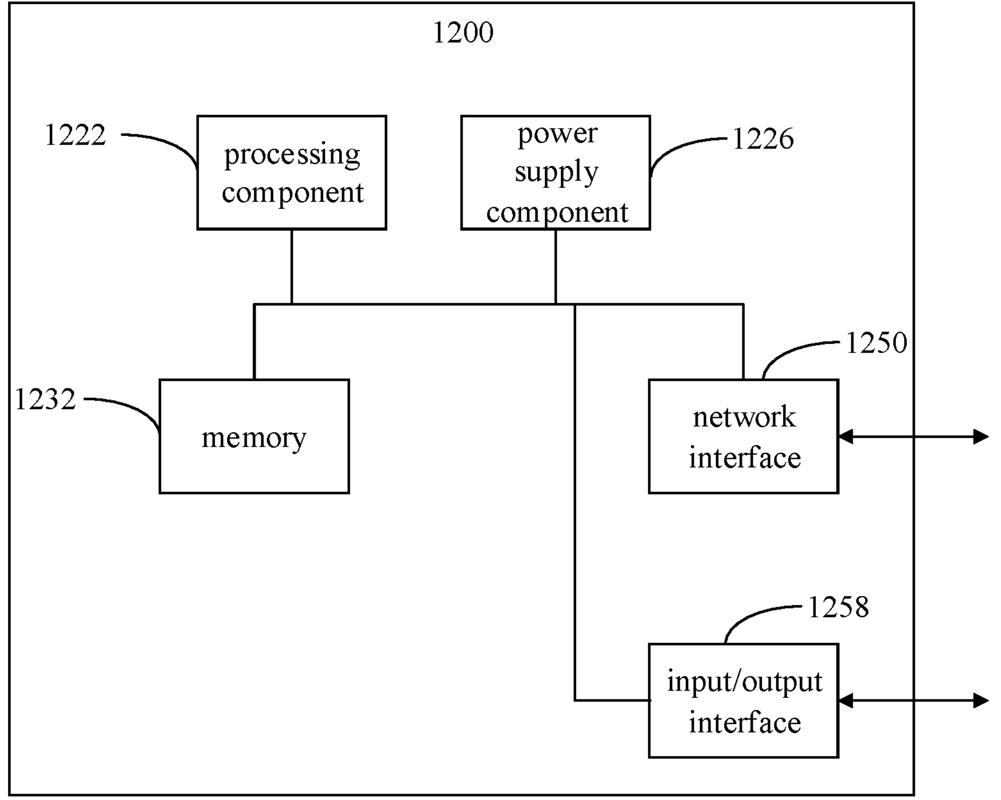
FIG. 12 is a block diagram of a base station provided by an embodiment of the present disclosure.

FIG. 12 is a block diagram of a base station 1200 provided by an embodiment of the present disclosure. For example, the base station 1200 may be provided as a base station. Referring to FIG. 12, the base station 1200 includes a processing component 1222, which further includes at least one processor, and a memory resource represented by a memory 1232 for storing instructions, such as application programs, executable by processing component 1222. The application program stored in the memory 1232 may include one or more modules, and each of them corresponds to a set of instructions. In addition, the processing component 1222 is configured to execute the instructions to perform any of the above-mentioned methods applied to the base station, for example, the method shown in FIG. 1.

The base station 1200 may also include a power supply component 1226 configured to perform power management of the base station 1200, a wired or wireless network interface 1250 configured to connect the base station 1200 to a network, and an input/output (I/O) interface 1258. The base station 1200 may operate based on an operating system stored in memory 1232, such as Windows Server™, Mac OS X™, Unix™, Linux™, FreeBSD™ or the like.

In the above-mentioned embodiments provided by the present disclosure, the methods provided by embodiments of the present disclosure are introduced from the perspectives of the base stations and the UEs respectively. In order to implement the functions in the methods provided by the above-mentioned embodiments of the present disclosure, the base station and the UE may include hardware structures and software modules to implement the above functions in the form of hardware structures, software modules, or hardware structures plus software modules. A certain function among the above functions may be executed by a hardware structure, a software module, or a hardware structure plus a software module.

A communication device is provided by an embodiment of the present disclosure. The communication device may include a transceiver module and a processing module. The transceiver module may include a sending module and/or a receiving module. The sending module is configured to implement the sending function, and the receiving module is configured to implement the receiving function. The transceiver module may implement the sending function and/or the receiving function.

The communication device may be a terminal device (such as the terminal device in the foregoing method embodiment), a device in the terminal device, or a device that may be used in conjunction with the terminal device. Alternatively, the communication device may be a network device, a device in a network device, or a device that may be used in conjunction with the network device.

A communication device is provided by another embodiment of the present disclosure. The communication device may be a network device, or may be a terminal device (such as the terminal device in the above-mentioned method embodiment), or may be a chip, chip system, or processor that supports the network device to implement the above method, or may be a terminal device that supports a chip, a chip system, or a processor that implements the above-mentioned method. The device may be used to implement the method described in the above method embodiment. For details, please refer to the description in the above method-mentioned embodiments.

The communications device may include one or more processors. The processor may be a general-purpose processor or a special-purpose processor, etc. For example, it may be a baseband processor or a central processing unit. The baseband processor may be used to process communication protocols and communication data. The central processor may be used to control communication devices (such as base stations, baseband chips, terminal equipment, terminal equipment chips, DU or CU, etc.) and execute computer programs and process data of the computer programs.

Alternatively, the communication device may also include one or more memories, on which a computer program may be stored, and the processor executes the computer program, so that the communication device executes the method described in the above-mentioned method embodiments. Alternatively, data may also be stored in the memory. The communication device and the memory may be provided separately or integrated together.

Alternatively, the communication device may also include a transceiver and an antenna. The transceiver may be called a transceiver unit, a transceiver, or a transceiver circuit, etc., and configured to implement transceiver functions. The transceiver may include a receiver and a transmitter. The receiver may be called a receiver or a receiving circuit, etc., and configured to implement the receiving function. The transmitter may be called a transmitter or a transmitting circuit, etc., and configured to implement the transmitting function.

Alternatively, the communication device may also include one or more interface circuits. The interface circuitry is configured to receive code instructions and transmit them to the processor. The processor executes code instructions to cause the communication device to perform the method described in the above-mentioned method embodiments.

The communication device is a terminal device (such as the terminal device in the above-mentioned method embodiments), and the processor is configured to execute the method shown in any one of FIGS. 1 to 4.

The communication device is a network device, and a transceiver is configured to perform the method shown in any one of FIGS. 5 to 8.

In one implementation, the processor may include a transceiver for implementing receiving and transmitting functions. For example, the transceiver may be a transceiver circuit, an interface, or an interface circuit. The transceiver circuits, the interfaces or the interface circuits configured to implement the receiving and transmitting functions may be separate or integrated together. The above-mentioned transceiver circuit, interface or interface circuit may be configured for reading and writing codes/data, or the above-mentioned transceiver circuit, interface or interface circuit may be used for signal transmission or transfer.

In one implementation, the processor may store a computer program, and the computer program runs on the processor, which may cause the communication device to perform the method described in the above-mentioned method embodiments. The computer program may be embedded in the processor, in which case the processor may be implemented in hardware.

In one implementation, the communication device may include a circuit, and the circuit may implement sending or receiving or communication functions in the above-mentioned method embodiments. The processor and the transceiver described in the present disclosure may be implemented in an integrated circuits (IC), an analog IC, a radio frequency integrated circuits (RFIC), a mixed signal (IC), an application specific integrated circuits (ASIC), a printed circuit boards (PCB), electronic equipment, etc. The processor and the transceiver may also be manufactured using various IC process technologies, such as a complementary metal oxide semiconductor (CMOS), a N-type metal-oxide-semiconductor (NMOS), a P-type metal oxide semiconductor (PMOS), a bipolar junction transistor (BJT), a bipolar CMOS (BiCMOS), a silicon germanium (SiGe), a gallium arsenide (GaAs), etc.

The communication device described in the above-mentioned embodiments may be a network device or a terminal device (such as the terminal device in the foregoing method embodiment), but the scope of the communication device described in the present disclosure is not limited thereto, and the structure of the communication device may not be limited to limits. The communication device may be a stand-alone device or may be part of a larger device. For example, the communication device may be:

(1) independent integrated circuit (IC), or chip, or chip system or subsystem;

(2) a collection of one or more ICs, or, the IC collection may also include storage components for storing data and computer programs;

(3) ASIC, such as modem;

(4) modules that may be embedded in other devices;

(5) receivers, terminal device, intelligent terminal device, cellular phones, wireless equipment, handheld devices, mobile units, vehicle-mounted equipment, network equipment, cloud equipment, artificial intelligence equipment, etc.;

(6) others.

In case that the communication device is a chip or a system on a chip, the chip includes a processor and an interface. The number of processors may be one or more, and the number of interfaces may be multiple.

Alternatively, the chip also includes a memory, which is configured to store necessary computer programs and data.

The various illustrative logical blocks and steps listed in embodiments of the present disclosure may be implemented by electronic hardware, computer software, or a combination of both. Whether such functionality is implemented in hardware or software depends on the specific application and overall system design requirements. In some embodiments, various methods may be used to implement the functions for each specific application, but such implementation should not be understood as exceeding the scope of protection of embodiments of the present disclosure.

Embodiments of the present disclosure also provide a system for determining side link duration. The system includes a communication device as a terminal device in the foregoing embodiment (such as the first terminal device in the above-mentioned method embodiments) and a communication device as a network device. Alternatively, the system includes a communication device as a terminal device in the above-mentioned embodiments (such as the first terminal device in the above-mentioned method embodiments) and a communication device as a network device.

The present disclosure also provides a readable storage medium on which instructions are stored. When the instructions are executed by a computer, the functions of any one of the above-mentioned method embodiments are implemented.

The present disclosure also provides a computer program product, when the computer program product is executed by a computer, the functions of any one of the above-mentioned method embodiments are implemented.

In the above-mentioned embodiments, it may be implemented in whole or in part by software, hardware, firmware, or any combination thereof. When implemented using software, it may be implemented in whole or in part in the form of a computer program product. A computer program product includes one or more computer programs. When a computer program is loaded and executed on a computer, processes or functions according to embodiments of the present disclosure are generated in whole or in part. The computer may be a general purpose computer, a special purpose computer, a computer network, or other programmable device. The computer program may be stored in or transmitted from one computer-readable storage medium to another computer-readable storage medium, for example, the computer program may be transmitted from a website, a computer, a server or a data center via a wireline (e.g. coaxial cable, optical fiber, digital subscriber line (DSL)) or wireless (such as infrared, wireless, microwave, etc.) means to transmit to another website, computer, server or data center. The computer-readable storage media may be any available media that may be accessed by a computer or a data storage device such as a server, data center, or other integrated media that contains one or more available media. The usable media may be magnetic media (e.g., floppy disks, hard disks, tapes), optical media (e.g., high-density digital video discs (DVDs)), or semiconductor media (e.g., solid state disks (SSDs)) and the like.

The first, second, and other numerical numbers involved in the present disclosure are only for convenience of description and are not used to limit the scope of embodiments of the present disclosure and also indicate the order.

At least one in the present disclosure may also be described as one or more, and the plurality may be two, three, four or more, and the present disclosure is not limited. In embodiments of the present disclosure, for a technical feature, the technical feature is distinguished by "first", "second", "third", "A", "B", "C" and "D", etc. The technical features described in "first", "second", "third", "A", "B", "C" and "D" are in no particular order or order.

The present disclosure is intended to cover any variations, uses, or adaptations of the present disclosure that follow the general principles of the present disclosure and include common sense or customary technical means in the technical field that are not disclosed in the present disclosure. It is intended that the specification and examples be considered as exemplary only, with a true scope and spirit of the disclosure being indicated by the following claims.

It is understood that the present disclosure is not limited to the precise structures described above and illustrated in the accompanying drawings, and various modifications and changes may be made without departing from the scope thereof. The scope of the present disclosure is limited only by the appended claims.

What is claimed is:

1. A method for determining a time domain window, comprising:

receiving, by a user equipment (UE), indication information sent by a base station, wherein the indication information comprises a parameter H configured to calculate a number M of time slots; and determining, by the UE, a time domain window based on the indication information;

wherein determining the time domain window based on the indication information comprises:

determining, by the UE, the number M of time slots based on the parameter H; and determining, by the UE, a parameter T based on the number M of time slots, wherein the parameter T is used to determine a specific number of time slots of the time domain window.

2. The method according to claim 1, wherein determining the number M of time slots based on the parameter H comprises:

determining the number M as that

M=floor (a number of time slots in consecutive time slot segments÷H), wherein a floor function is a downward rounding function.

3. The method according to claim 1, further comprising:

before determining, by the UE, the time domain window based on the indication information, determining, by the UE, at least one time domain window in consecutive time slot segments according to a time division duplex (TDD) time slot format.

4. A method for determining a time domain window, comprising:

sending, by a base station, indication information to a UE, to enable the UE to determine a time domain window based on the indication information, wherein the indication information comprises a parameter H configured to calculate a number M of time slots, to enable the UE to determine a number M of time slots based on the parameter H and determine a parameter T based on the number M of time slots, and the parameter T is used to determine a specific number of time slots of the time domain window.

5. The method according to claim 4, further comprising:

determining, by the base station, the parameter H based on a capability of the UE or a time slot format of the UE.

6. A communication device, comprising:

a processor;

a memory; and a computer program stored in the memory;

wherein the processor is configured to execute the computer program stored in the memory, to cause the communication device to:

receive indication information sent by a base station;

determine a time domain window based on the indication information;

wherein the indication information comprises a parameter H configured to calculate a number M of time slots; and the processor is configured to execute the computer program stored in the memory, to cause the communication device to:

determine the number M of time slots based on the parameter H;

determine a parameter T based on the number M of time slots, wherein the parameter Tis used to determine a specific number of time slots of the time domain window.

7. The communication device according to claim 6, wherein the device is further configured to determine the number M as that M=floor (a number of time slots in consecutive time slot segments÷H), wherein a floor function is a downward rounding function.

8. The communication device according to claim 6, wherein the device is further configured to:

determine at least one time domain window in consecutive time slot segments according to a time division duplex (TDD) time slot format.

9. A communication device, comprising:

a processor;

a memory; and a computer program stored in the memory;

wherein the processor is configured to execute the computer program stored in the memory, to cause the device to execute the method according to claim 4.

10. A non-transitory computer-readable storage medium having stored therein indications that, when executed, cause the method according to claim 1 to be implemented.

11. A non-transitory computer-readable storage medium having stored therein indications that, when executed, cause the method according to claim 4 to be implemented.

* * * * *